Jan. 30, 1962　　F. W. MEREDITH ETAL　　3,018,661
AIRCRAFT INSTRUMENTS

Filed March 4, 1957　　　　　　　　　　　　3 Sheets-Sheet 1

F. W. MEREDITH
A. M. A. MAJENDIE
Inventors

By Moore of Hall
Attorneys

Jan. 30, 1962  F. W. MEREDITH ETAL  3,018,661
AIRCRAFT INSTRUMENTS

Filed March 4, 1957  3 Sheets-Sheet 2

F.W.MEREDITH &
A.M.A. MAJENDIE
Inventors

By Moore & Hall
Attorneys

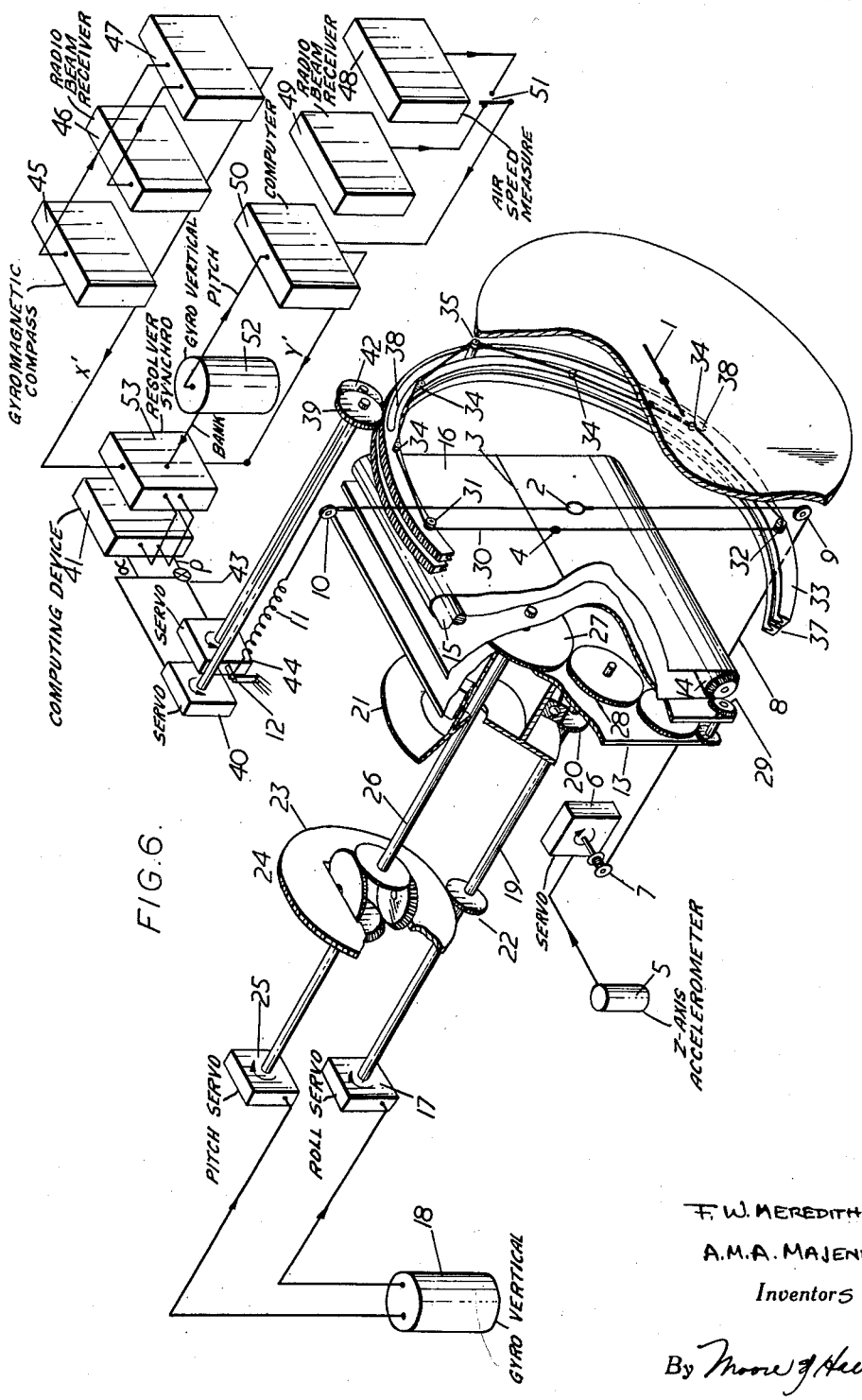

3,018,661
AIRCRAFT INSTRUMENTS
Frederick William Meredith, "Ardvarna," Cleeve Hill, Cheltenham, England, and Alastair Michael Adair Majendie, High Ridge, Winter Hill, Cookham Dean, England
Filed Mar. 4, 1957, Ser. No. 643,835
11 Claims. (Cl. 73—178)

The present invention relates to aircraft instruments for assisting the control of an aircraft by a human pilot in such a manner that the direction of its line of flight (that of its flight vector) is such as to achieve and maintain a desired flight path.

It is an object of the present invention to provide an aircraft instrument constructed to facilitate the control of an aircraft simultaneously in pitch and roll by a human pilot and which preferably is combined with means to display the pitch and roll attitude of the aircraft to give a readily appreciated indication of the actual attitude of the aircraft and the action which is required to attain the desired flight path.

The attitude of an aircraft can be defined by the directions of three mutually perpendicular axes in the aircraft through its centre of gravity. The X and Z axes lie in the symmetry plane, the X axis being a fixed line, pointing forward, approximately parallel to the centre line of the body, and the Z axis at right angles to this and pointing downward when in straight and level flight. The Y axis is normal to the plane of symmetry and directed towards the starboard wing. It is convenient to fix the direction of the X axis to point in the direction of flight (the wind axis) in normal undisturbed flight. During any changes from straight and level flight the X axis may deviate from the wind axis, the angular deviation in the symmetry plane being the change of angle of incidence and the angular deviation normal to this being the sideslip angle. In correct operation of an aircraft, both these angles are sufficiently small that the difference which they could make on the display to be described can be ignored. Thus it is assumed that the flight vector (whose direction is that of the wind axis and whose magnitude is equal to the airspeed) coincides with the X axis of the aircraft in all conditions.

It is convenient to resolve every force or acceleration into components, one along the X axis and the other in the YZ plane, hereinafter referred to as the normal plane. The algebraic sum of the components of the forces along the X axis, including forces produced aerodynamically, by the propulsive mechanism, and by the action of gravity, determines the rate of change of the magnitude of the flight vector. The vector sum of the components of the forces in the normal plane determines the magnitude and direction of the rate of turn of the flight vector. In the absence of side slip and also, as will be assumed, in the absence of transverse wind components, the component of the aerodynamic forces in the normal plane must coincide with the Z axis.

For a complete understanding of the invention it is desirable to refer to three special frames of reference, defined by appropriate sets of axes:

By the term absolute aircraft axes we mean a set of axes which instantaneously coincide with the aircraft axes but are non-rotating and of which the origin is falling free. Thus a mass free from restraint will be unaccelerated in relation to absolute axes as defined.

By the term roll stabilised axes we mean a non-rotating set of axes in which the origin coincides with the origin of the aircraft axes, the X axis instantaneously coincides with the aircraft X axis but the Y axis is horizontal and the Z axis is never above the horizontal.

By the term roll stabilised absolute axes we mean a set of axes which instantaneously coincide with the roll stabilised axes, are non-rotating and of which the origin is falling free.

By the term absolute acceleration we mean the external force to which the aeroplane is subject (excluding gravity) divided by the mass of the aircraft, i.e. the acceleration of the aircraft referred to absolute axes.

By the term normal plane acceleration we shall mean that component of acceleration normal to the flight vector, i.e. in the normal plane.

In these definitions and throughout this specification and the appended claims, the effects of wind on the aircraft are ignored.

In accordance with the invention we provide an instrument having an index, means to displace the said index relative to a datum in accordance with the normal plane absolute acceleration along the Z axis, a further index and means to displace the further index in relation to the datum in accordance with a demanded value (both as to magnitude and direction) of the normal plane absolute acceleration, whereby manoeuvre of the aircraft, by banking to rotate the direction of the demanded normal plane absolute acceleration relative to the aircraft and by pitching to vary the magnitude of the normal plane absolute acceleration so as to superpose the index and the further index results in the attainment of the demanded normal plane absolute acceleration.

One convenient method for displaying the normal absolute acceleration is by displacement of the index along a line whose orientation is fixed relative to the case of the instrument. The datum for the normal absolute acceleration may be defined by a fixed index indicative of the Y or transverse axis of the aircraft.

A conventional representation of the horizon may be provided, displaced relative to the fixed index in accordance with the pitch and roll attitude of the aircraft.

A convenient method of displaying the demanded normal plane absolute acceleration is by displacement of the further index along and at right angles to the horizon, in accordance with the components of demanded normal plane absolute acceleration in these directions.

An instrument according to the present invention thus may display to a pilot information relating to the present attitude and normal plane absolute acceleration of his aircraft, and simultaneously the normal plane absolute acceleration which the aircraft should assume to follow some desired flight path.

It will be seen that by use of the invention the required manoeuvre demands are displayed in relation to one of the two sets of absolute axes. This is particularly advantageous, since the acceleration force under the control of the pilot produces accelerations in relation to these axes.

The invention, and various embodiments thereof, will now be described with reference to the accompanying drawings, of which FIGURE 1 shows diagrammatically the attitude of an aircraft, the direction of its flight vector, the normal absolute acceleration to which it is subjected, and the component of gravity in the normal plane.

FIGURE 6 shows schematically one particular form of instrument constructed in accordance with the present invention.

Figure 1:
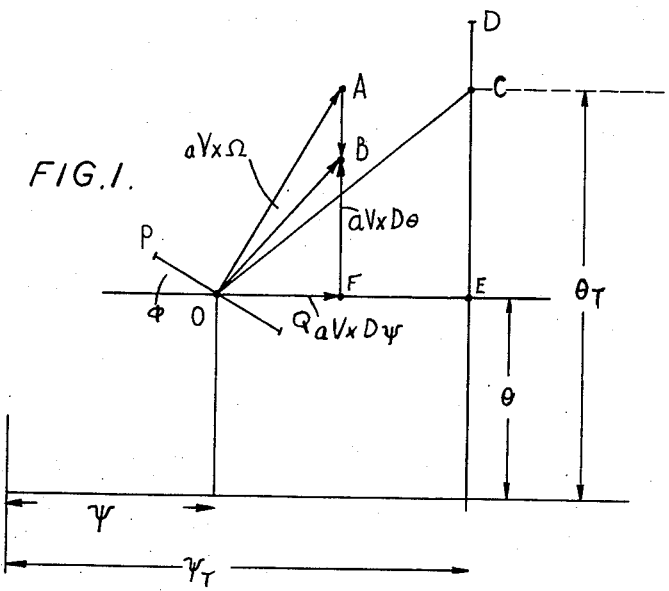

Referring to FIGURE 1 the point O represents, by means of a suitable projection, the intersection of the aircraft X=axis with the surface of a reference sphere centred on the aircraft. The aircraft attitude is denoted by the angles: $\psi$ heading; $\theta$ pitch; $\phi$ bank; as conventionally defined.

The transverse of Y axis of the aircraft is indicated by the line POQ. The desired on-target attitude is shown by point C, where the desired values of heading and pitch are indicated as $\psi_T$ and $\theta_T$.

The normal plane absolute acceleration of magnitude $Ng$ is represented by a vector of length $aNg$ ("$a$" being a scale factor, "N" being a positive number and "$g$" the acceleration due to gravity) indicated at OA.

The component of acceleration, referred to fixed axes, due to gravity in the normal plane is of magnitude $g \cos \theta$ and is at an angle $(90° - \phi)$ to the transverse axis of the aircraft. It may thus be represented by a vector AB of length $ag \cos \theta$ in the direction of $\theta$ decreasing. Thus the vector OB represents the acceleration referred to fixed axes in the plane normal to the flight vector, which is, in accordance with ordinary dynamical principles, the vector product $V \times \Omega$ where $\Omega$ is the instantaneous rate of rotation of the flight vector and V is the flight vector. OB thus has length $aV \times \Omega$. Vector OB can be resolved into a horizontal component $aD \times D\psi$ and a component at right angles thereto $aV \times D\theta$. Here and elsewhere the symbol "D" is used to represent the operator of differentiation with respect to time. OE, in the direction of $\psi$ increasing, represents the discrepancy between demanded and actual heading and EC, in the direction of $\theta$ increasing, represents the discrepancy between demanded and actual pitch. The discrepancies $(\psi_T - \psi)$ and $(\theta_T - \theta)$ may be denoted $-\psi_E$ and $-\theta_E$ respectively.

If now the aircraft is manoeuvred so that B and C coincide and $\psi_T$ and $\theta_T$ are fixed, we shall have the relations $$aV \times D\psi_E + \psi_E = 0$$
$$aD \times D\theta_E + \theta_E = 0$$

i.e. the flight vector subsides on to the desired direction with time constant $aV$ (if V is constant).

It is evident that the point C, which has been defined as determined by a demanded direction, may also be regarded as defined by a demanded acceleration referred to fixed axes in the normal plane.

It will be seen that precisely the same result may be attained by introducing a further vector CD, extending in the direction of $\theta$ increasing, of magnitude $ag \cos \theta$, i.e. equal and opposite to vector AB, and controlling the aircraft in such a manner that point A lies on point D.

It will be appreciated that the vector OC represents, referred to axes through O in the direction of $\psi$ increasing and $\theta$ increasing respectively, the required normal plane acceleration referred to roll stabilised axes, whereas the vector OD represents the same quantity referred to roll stabilised absolute axes. Also the vector OB represents the actual normal plane acceleration referred to roll stabilised axes and OA represents the same quantity referred to absolute roll stabilised axes, i.e. the normal plane absolute acceleration.

Referred to axes lying along and at right angles to the line POQ, these vectors represent the same quantities referred to the corresponding aircraft axes.

In an instrument in accordance with the present invention the vectors OA and OD are displayed, i.e. the normal plane absolute acceleration (by point A) and the demanded normal plane absolute acceleration (by point D). It will be appreciated that the vector OA represents the quantity, the normal plane absolute acceleration, directly under the pilot's control for the manoeuvre of the aircraft, its direction being controlled by banking and its magnitude by pitching.

Most conveniently the display is provided by movement of points A and D in relation to an index, fixed in the instrument, corresponding to the line POQ.

In the embodiment of the invention shown in the remaining figures the instrument indications are provided within the compass of a conventional circular viewing aperture upon an indicator, as shown. In the ensuing description connecting lines indicate channels for the flow of information, which information will be preferably conveyed by amplitude-modulated A.C. signals. A fixed index 1 is provided, in the form of a symbolic representation of the rear view of the wings of an aircraft, its Y axis across the display and Z axis down the display and thus corresponding to line POQ in FIGURE 1. A normal plane absolute acceleration index 2 is provided in the form of a ring with a downwardly-extending line. In accordance with the assumption that the normal plane absolute acceleration is along the aircraft Z axis, index 2 is displaced along the Z axis (positive or negative) of the aircraft representation forming index 1, so that the centre of the circle is displaced from the centre of index 1 by an amount proportional to the normal plane absolute acceleration, under the control of a conventional accelerometer mounted on the aircraft so as to be responsive to acceleration of the aircraft along the Z axis. The accelerometer 5 controls a servo 6 fixed in the indicator. Servo 6 positions a drum 7 upon which is wrapped a wire 8 carrying index 2, the wire passing round pulleys 9, 10, and being attached to one end of a tension spring 11 whose other end is fixed, at 12. The wire 8 and the pulleys 9 and 10 constitute means guiding the index for displacement along a line whose orientation is fixed in the instrument.

Behind indices 1 and 2 is mounted a "roller blind" type of artificial horizon indicator, giving "moving horizon" presentation. This comprises a carriage 13 mounted for rotation about an axis passing through the centre of index 1, the "indicator axis," carrying a pair of rollers 14, 15 over which a flexible band 16 passes. Carriage 13 is positioned by an electric servo system 17 controlled from a remotely situated first gyro vertical 18 in accordance with the roll attitude of the aircraft, the servo system rotating a shaft 19 carrying a pinion 20 engaging with a gear 21 attached to carriage 13. Shaft 19 also carries a pinion 22 engaging with a gear 23 forming one input of a conventional mechanical differential 24. The other input of the differential 24 is positioned in accordance with the pitch attitude of the aircraft by an electric servo 25 also controlled from gyro vertical 18. The output of the differential 24 is transmitted by a shaft 26 lying on the indicator axis. Shaft 26 carries a gear 27 capable of driving, through a train 28 and bevel gears 29, roller 14.

The servo systems 17 and 25 and the various gear ratios are such that the rotation of the carriage 13 relative to the index 1 is equal to the bank angle of the aircraft and rotation of shaft 19 with servo 25 stationary results in no relative movement between gear 27 and carriage 13. It thus follows that roller 14, and hence band 16, are moved in accordance with the pitch attitude of the aircraft, and this movement is such that the total extent of band 16 visible corresponds to about 120° of pitch movement. The band 16 is distinctively coloured to give an indication of the horizon, as at 3, and representations of the zenith and nadir are also provided on the band, so that the index 1 co-operates with the band to give a display corresponding to that of a conventional gyroscope artificial horizon instrument.

Figure 2:
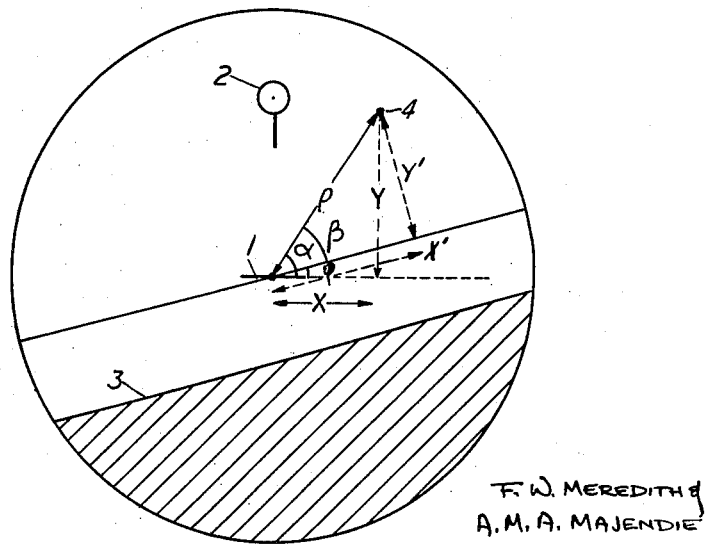
FIGURES 2 to 5 show the display provided by an instrument embodying features of the present invention in various flight conditions.

A director index 4 is provided, in the form of a dot rather smaller than the internal diameter of the ring of index 2. Director index 4 is positioned so that its distance from the representation of the horizon 3 corresponds to the desired pitch attitude of the aircraft plus $ag \cos \theta$, and its distance from the centre line of the band 16 corresponds to the difference between the desired and actual heading of the aircraft. If lines parallel and perpendicular to the horizon are imagined drawn through the centre of index 1, then it follows from the above that the displacement of index 4 from the imaginary line parallel to the horizon, indicated by Y' in FIGURE 2, is proportional to $ag \cos \theta - \theta_E$, and its distance from the line perpendicular to the horizon, indicated at X' in FIGURE 2, corresponds to $-\psi_E$.

The intelligence by means of which index 4 is positioned may be obtained from instruments completely separate from the gyro vertical 18 controlling the position of the band 16.

Index 4 is mounted upon a wire 30 passed round rollers 31, 32 mounted upon a ring gear 33 centred on the indicator axis. Wire 30 lies diametrally across gear 33, and passes round further guide rollers 34 mounted on gear 33, being attached at one point to a peg 35 attached to a further ring gear 37 extending through an arcuate slot 38 in gear 33. Gear 37 is also mounted for rotation about the indicator axis. Gear 33 is engaged by a pinion 39 positioned by a servo 40. Servo 40 is controlled by a first output from a computing device 41, which is proportional to the angle $\alpha$ indicated in FIGURE 2. Gear 37 is engaged by a pinion 42, positioned by a servo 44 controlled by the output from a differential 43. The inputs to differential 43 consist of the two outputs from device 41. The second of these is proportional to the distance $\rho$ indicated in FIGURE 2. Thus it will be seen that the angular position of wire 30 will be given by the angle $\alpha$, and the radial position of index 4 will be given by the distance $\rho$.

One manner in which the intelligence for positioning index 4 (i.e. the quantities $\alpha$ and $\rho$) may be obtained will now be described.

A directional device is provided to generate a signal representing the difference between the actual heading of the craft and the desired heading if some desired flight path is to be followed. In a particular form, as indicated in FIGURE 6, this includes a gyromagnetic compass 45 and a radio device 46, such as a conventional directional radio beam receiver, or a conventional radar installation or instrument landing system, providing a signal representing the bearing of a target being tracked, which respectively provide signals representing the actual heading of the craft and the desired heading if some desired flight path is to be followed. These signals are applied to a computer 47 which generates a signal representing the difference between the signals applied to it. The output from this device is thus proportional to $-\psi_E$, or the quantity X' of FIGURE 2.

An air speed responsive device, indicated at 48, and a further radio device, indicated at 49, such as a conventional glide path receiver or a conventional radar installation providing a signal representing the elevation of a target being tracked, provide signals one or other of which can be applied to the input of a further computer device 50, as indicated by a change-over switch 51. Computer 50 determines from these signals and from pitch signals derived from a gyro vertical 52 the difference between the actual pitch attitude of the aircraft and that required if some desired flight path is to be followed—that is to say the quantity $-\theta_E$. This is added to a signal proportional to $ag \cos \theta$ (derived from intelligence also obtained from gyro vertical 52), to give a total output proportional to the quantity Y' of FIGURE 2.

The X' and Y' signals from devices 47 and 50 are applied to the separate stator inputs of a conventional resolver synchro indicated at 53. The rotor of the resolver is positioned in accordance with the bank angle $\phi$ under the control of gyro vertical 52, and outputs are obtained from the separate rotor windings respectively proportional to $$X' \cos \phi - Y' \sin \phi$$
and
$$X' \sin \phi + Y' \cos \phi$$

These quantities are related to $\rho$ and $\alpha$ by the relations $$\rho \cos \alpha = X' \cos \phi - Y' \sin \phi$$
$$\rho \sin \alpha = X' \sin \phi - Y' \cos \phi$$

They are applied as inputs to computer 41, previously referred to. Computer 41 comprises a further resolver synchro, to the separate stator windings of which the "$\rho \cos \alpha$" and "$\rho \sin \alpha$" signals are applied. The rotor of the synchro is positioned by a motor energised from one of the rotor windings of the synchro, which thus positions the rotor so that this winding is at right angles to the resultant field produced by the stator windings, i.e. the rotor is so positioned that its angular displacement from some datum position is equal to $\alpha$, and a suitable signal generating device positioned by the motor is utilised to give the desired $\alpha$ signal output from computer 41. The signal induced in the second rotor winding will be proportional to $\rho$ and is utilised to provide the $\rho$ signal output from computer 41.

As described above the manoeuvre demand is derived from position information, and the use of the instrument will eventually, if there is no change in the desired flight path, bring the aircraft to a condition of non-turning flight. However, the manoeuvre demand could be, for example, for continuously turning flight at a constant rate of turn.

As noted above, as far as the scale of the display is concerned, it is convenient to make the radius of the visible portion of the band 16, correspond to 60° (i.e. approximately 1 radian) pitch (or heading) deviation, when one at least of the representations of zenith, horizon and nadir on the band will always be in view.

A maximum manoeuvre demand will then be given by $$aNg = 1$$

If we limit the maximum acceleration to be demanded in any manoeuvre to, say, 6g, this means that $$ag = \frac{1}{6}$$

and the time constant of subsidence will be $\frac{1}{6} \cdot V/g$. The displacement of the centre of the ring of index 2 from the centre of index 1 will in conditions of straight and level flight correspond to a normal acceleration of g, and the length of the vertical stroke of the index 2 is preferably such that, under these conditions, its end lies at the centre of index 1. Preferably also in such conditions the centre of index 2 lies at the centre of the display.

Figure 3:
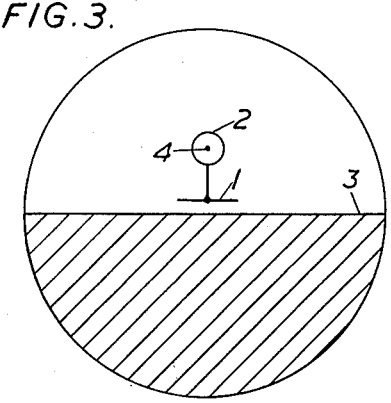
Figure 4:
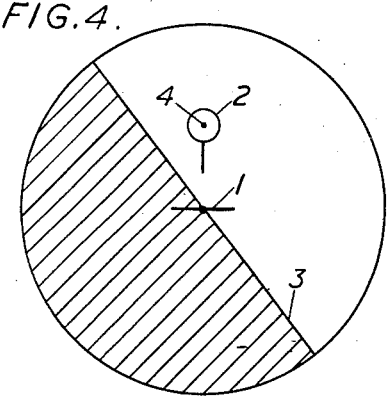
Figure 5:
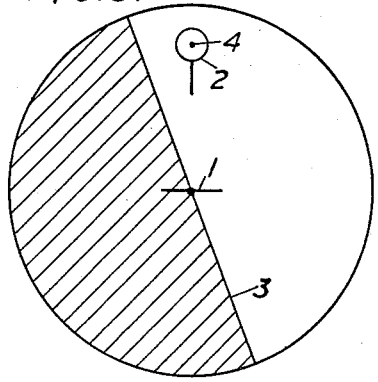

FIGURES 3, 4 and 5 show the display in various flight conditions, when the manoeuvre demand is being met, that is to say when index 2 is brought into alignment with index 4.

FIGURE 3 shows the display when climbing at about 2° with the aircraft level in bank and on the demanded attitude.

FIGURE 4 shows the display when following a demand for a steady horizontal turn at 52° bank to the left.

FIGURE 5 shows the display when following a demand for a horizontal 4½g turn to the left.

The sense of the pitch and bank corrections required are always clear from the display, even if negative lift manoeuvre is required.

The particular instrument described with reference to FIGURES 2 to 6 utilises a "moving horizon" presentation for aircraft attitude, the aircraft representation (index 1) being fixed in the instrument. Alternatively a "moving aircraft" presentation of aircraft attitude could be used, (the representation of the horizon then being fixed in the instrument), various mechanical means by which this could be achieved being obvious to those skilled in the art. However, a "moving aircraft" presentation would be substantially more complicated mechanically.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. An aircraft instrument comprising means to define a viewing aperture, a first index supported for movement within the aperture, means within the aperture to define a datum position for the first index, driving means connected to the first index, means to control the driving means in accordance with the component of the normal plane absolute acceleration of the aircraft in direction of its Z axis so that the displacement of the first index from the said datum position is proportional to the said component of the normal plane absolute acceleration of the aircraft, a further index supported for movement within the aperture and means to displace the further index in relation to the said datum position in accordance with a demanded value, both as to magnitude and direction of the normal plane absolute acceleration, said demanded value being that required if some desired flight path is to be achieved and a maneuver of the aircraft in bank and pitch to superpose the first index and further index thus resulting in the attainment of the demanded normal plane acceleration and the desired flight path, neglecting any components of the normal plane absolute acceleration in the direction of the transverse axis of the aircraft.

2. An instrument according to claim 1 comprising means for guiding the displacement of the index along a line whose orientation is fixed in the instrument.

3. An instrument according to claim 2 wherein the means to define the datum position comprises a fixed index indicative of the transverse axis of the aircraft.

4. An instrument according to claim 3 wherein the means to displace the further index are operative to displace it linearly from and to rotate it angularly about the fixed index in accordance with the magnitude and direction of the demanded value of the normal plane absolute acceleration referred to absolute aircraft axes.

5. An instrument according to claim 4 wherein the means to displace the further index comprise both devices responsive to deviation of the aircraft from some selected flight path and a device responsive to the pitch and roll attitude of the aircraft.

6. An instrument according to claim 5 comprising also means to provide a representation of the horizon and means to position the same in relation to the fixed index in accordance with the pitch and roll attitude of the aircraft.

7. An instrument according to claim 6 wherein the means to position the representation of the horizon are independent of the means to position the further index.

8. An aircraft instrument comprising means to define a viewing aperture, a first index supported for movement and positioned to be viewed through the aperture, datum position defining means for said first index, driving means connected to the first index, means connected to control said driving means in accordance with the component of normal plane absolute acceleration of the aircraft in the direction of its Z axis so that the displacement of the first index from the said datum position is proportional to the said component of the normal plane absolute acceleration, a second index supported for movement and positioned to be viewed through the aperture and means connected to displace said second index relative to said datum position defining means in accordance with a demanded vector value of the normal plane absolute acceleration, said demanded value being that required by a desired flight path and a maneuver of the aircraft in bank and pitch to superpose said indices giving an indication that the desired flight path of the plane has been attained.

9. An aircraft instrument for assisting a human pilot to control an aircraft simultaneously in pitch and roll, comprising in combination a first index means supported for movement relative to the aircraft, means to define a datum position for said first index, driving means connected to move said first index, means to control said driving means in accordance with the component of the normal plane absolute acceleration of the aircraft along its Z axis, a second index means supported for movement relative to the aircraft, and means to displace said second index means relative to said datum position in accordance with a demanded value, both as to magnitude and direction of the effective value of the normal plane absolute acceleration, said demanded value being that required to achieve a desired flight path and the superposition of said first and second index means.

10. The combination set forth in claim 9, said first index means being in the form of a ring with a downwardly extending line, said driving means comprising a servo motor and movable wire means carrying said first index for movement in translation, said means to control said driving means comprising an accelerometer means mounted on the aircraft so as to be responsive to acceleration of the aircraft along its Z axis, said second index means being a director index in the form of a dot of smaller diameter than the internal diameter of said ring, said means to displace said second index means comprising a second wire means, a ring gear mounting said second wire means diametrically thereacross, a second ring gear carrying means acting to move said second wire to displace said second index, dual servo means for rotating said ring gears independently, a gyro vertical mounted on the aircraft to supply pitch signals, computer means connected to said gyro and to said dual servo means for supplying a first output for rotating said first ring gear to move said second index by rotation of its supporting wire means and for supplying a second output for rotating said second ring gear to move said second index radially in translation.

11. The combination set forth in claim 10, an artificial horizon indicator means mounted behind said first index means, said second index means and said means to define a datum position, said horizon indicator means comprising carriage means mounted for rotation about an axis passing through the center of said means to define a datum position, a pair of rollers having a flexible band bearing a horizon indication line thereon rotatably mounted on said carriage means, a gyro vertical means, differential means controlled by said gyro for rotating said rollers and moving said horizon indication in translation with respect to said means to define a datum position and drive means controlled by said gyro for rotating said carriage means for rotating said horizon indication with respect to said means to define a datum position.

References Cited in the file of this patent

UNITED STATES PATENTS

| | | |
|---|---|---|
| 2,737,640 | Barnaby | Mar. 6, 1956 |
| 2,782,395 | Hammond | Feb. 19, 1957 |
| 2,796,594 | Chombard | June 18, 1957 |